United States Patent Office 3,520,830
Patented July 21, 1970

3,520,830
METHOD OF AGGLOMERATING FINELY DIVIDED BAUXITE
Victor Audley Chapman, Jr., Houston, Tex., assignor to Stauffer Chemical Company, New York, N.Y., a corporation of Delaware
No Drawing. Filed July 7, 1967, Ser. No. 651,684
Int. Cl. B01j 11/06
U.S. Cl. 252—463      5 Claims

ABSTRACT OF THE DISCLOSURE

Bauxite fines are pelletized using a mix in which the binder component comprises an alkali metal hydroxide and an alkali metal carbonate.

---

This invention relates to the binding of finely divided alumina or bauxite into activated pellets having high mechanical strength and surface area.

Activated bauxite finds many applications in industry. Thus, it is used, for example, to remove water from various gases and liquids, in the decolorizing of organic liquids and as a catalyst for the conversion of hydrogen sulfide to sulfur.

The manufacture of activated bauxite from the naturally occurring alumina ore is reasonably standard. In the ore, the aluminum is contained primarily in the form of the trihydrate ($Al_2O_3 \cdot 3H_2O$ or $Al(OH)_3$). The raw ore is crushed and heated (1200° F.) to remove uncombined water and part of the combined water resulting in a product with a volatile matter content of usually 4 to 6 percent. Volatile matter is defined as water and other volatiles lost on heating at 1200° F. The activated product is marketed in various particle size fractions, e.g., 2 x 4 mesh.

Incident to the process outlined, a substantial portion of the bauxite is reduced to fines. Numerous attempts have been made to agglomerate these fines into usable pellets. The prior methods usually involve mixing the fines with a water solution of a material that acts as a binding agent. Subsequently, the mixture is pelletized, dried and calcined.

Certain of the binding agents hitherto employed, phosphoric acid for example, suffer from the disadvantage that while the hardness of the resultant bauxite pellets is acceptable, the surface area afforded is far too low. Conversely, other binder materials which have been used yield pellets that have a satisfactory surface area but insufficient hardness. Pellets prepared using a mixture of phosphoric acid and sulfuric acid have generally satisfactory properties, but the acid fumes evolved during the calcining are highly corrosive, causing equipment problems.

Some of the prior binding agents introduce undesirable items of cost. Thus, aluminum chloride produces pellets which are very sticky when first extruded. To overcome the sticking problem, a dusting or skin drying step is usually necessary.

In several of the conventional pelletizing processes, a substantial amount of the fines remain unagglomerated. Others require an expensive calcining of the bauxite to a low volatile matter content of about 1 percent before it is mixed with the binding agent, this in addition to the usual calcining after pellet formation.

As should by now be apparent, it is a principal object of this invention to provide a practical and economical process for producing activated bauxite pellets displaying a relatively high mechanical strength, low abrasion loss and high surface area.

The process herein is particularly characterized in the use of an alkali metal carbonate in combination with an aqueous solution of an alkali metal hydroxide as the binder material for the bauxite fines. The mixture, including the binder material, is formed into pellets by extrusion or other suitable means followed by drying and calcining to reduce the volatile matter (V.M.) content to less than 15 percent.

Bauxite fines employed according to the invention are preferably 100 percent minus 60 mesh or finer, i.e., the fines should pass a 60 mesh sieve. The bauxite from which the fines are derived need not have been calcined to remove the water of hydration. Fines derived from bauxite ground for use in plants producing aluminum sulfate have been found generally satisfactory.

Sodium hydroxide is the alkali hydroxide preferred for use in the practice of the invention. The NaOH is employed as a water solution having an effective strength of from about 8 to 15 percent depending on the particle size of the bauxite. The concentration of the hydroxide in the mixture with the fines can be from about 1 percent to 6 percent, preferably about 3 percent, on a completely water-free basis.

The invention herein is substantially predicated on the discovery that the addition of an alkali metal carbonate, preferably sodium carbonate, to the formulation of bauxite and alkali metal hydroxide facilitates the processing of the mix, improves the drying characteristics thereof and the properties of the finished product. More specifically, the addition of the carbonate increases the plasticity of the mix, reduces the wear on equipment such as pugmills and improves the green strength of the pellets. The pellets so prepared can be dried and calcined much more rapidly without cracking than can pellets prepared with aqueous alkali metal hydroxide alone. To be able to heat the pellets more rapidly represents a distinct economic advantage. Significantly, the addition of the carbonate in proper amount results in pellets with a higher surface area, yet without any serious reduction in hardness.

Using sodium carbonate in the practice of the invention, the same is employed in an amount representing from about 1 percent to 6 percent of the weight of the mix on a completely water-free basis. The expression "water-free" is meant to exclude the water added with the alkali metal hydroxide and water in the bauxite.

In the following comparative examples submitted in illustration of the invention, the pellet hardness was measured by the widely used Houdry four ball attrition test. This test is conducted by first determining the weight of 80 cc. of the pellets retained on a 12 mesh screen. The pellets and four 1" steel balls are then added to a 4" x 3½" O.D. ball-mill jar made of stainless steel. The tightly closed jar is rotated about its longitudinal axis at about 90 r.p.m. for one hour; whereafter the pellets are deposited on a 12 mesh U.S. Tyler screen. Hardness is expressed as the percentage of the original sample weight retained on the screen.

Surface area, which, as well understood, is an important property of activated bauxite, was measured in the experiments conforming to the examples by the standard Brunauer, Emmett and Teller method. The pellets were outgassed for 16 hours at 350° F. prior to the surface area determinations.

EXAMPLE 1

The effectiveness of sodium carbonate as the sole binding agent was investigated. Thus, a mixture containing 80.0 percent bauxite, 18.3 percent water and 1.7 percent sodium carbonate was milled and extruded into 5/16" diameter pellets. The pellets were dried and finally calcined at 700° F. for a total time of 3 hours. These pellets had a 0 percent hardness and were otherwise completely unsatisfactory.

EXAMPLE 2

A mixture consisting of 17.0 percent of a 12 percent solution of sodium hydroxide and 82 percent bauxite was milled and extruded into pellets 5/16" in diameter. The dried and calcined pellets had a hardness of 88 percent unabraded and a surface area of 177 square meters per gram. The pellets were dried and calcined according to the following schedule: 250° F. for 8 hours, 480° F. for 2 hours, increased temperature from 480° F. to 932° F. over 2 hours and finally 932° F. for 2 hours.

EXAMPLE 3

A mixture consisting of 15.2 percent of a 13 percent solution of sodium hydroxide and 84.8 percent bauxite was milled and extruded into pellets 5/16" in diameter. The pellets were dried and finally calcined at 700° F. for a total heating time of 3 hours. The resulting product had a hardness of 55 percent unabraded which is too low to be desirable. Moreover, many of the pellets were found to be cracked.

EXAMPLE 4

The experiment of this example provide that the use of sodium carbonate and sodium hydroxide together is better than either one alone.

A mixture consisting of 1.3 percent by weight sodium carbonate, 15.3 percent of a 13 percent solution of sodium hydroxide and 83.4 percent bauxite was milled and extruded into 5/16" diameter pellets. The pellets were dried and finally calcined at 700° F. for a total heating time of 3 hours. Almost no cracks appeared in the pellets. The pellets had a volatile matter content of 6.4 percent, a hardness of 84 percent unabraded and 202 square meters per gram surface area. The determinations are to be compared to (1) a commercial bauxite pellet product found to have a hardness of 70 percent and a surface area of 120 square meters per gram and (2) a commercial 2 x 4 mesh activated bauxite of the natural product type (not derived from fines) found to have 152 square meters per gram surface area and a hardness of 46 percent unabraded.

The invention claimed is:

1. The method of producing bauxite pellets from bauxite fines which comprises forming a mix combining the fines, an alkali metal carbonate, an alkali metal hydroxide and water, forming the mix into pellets and calcining the pellets to reduce the volatile matter content thereof to less than 15 percent.

2. The method of claim 1 where the alkali metal carbonate and alkali metal hydroxide are, respectively, sodium carbonate and sodium hydroxide.

3. The method of claim 2 when the sodium hydroxide concentration in the mix on a completely water-free basis is within the range of 1 percent to 6 percent.

4. The method of claim 3 when the hydroxide concentration on the indicated basis is about 3 percent.

5. The method of claim 3 when the concentration of the carbonate in the mix on a completely water-free basis lies within the range 0.5 percent to 5 percent.

References Cited

UNITED STATES PATENTS

| | | | |
|---|---|---|---|
| 2,365,702 | 12/1944 | Hignett | 23—141 |
| 1,931,374 | 10/1933 | Clark | 23—52 |
| 2,495,278 | 1/1950 | Nickels | 260—669 |
| 3,228,891 | 1/1966 | Duke | 252—448 |
| 3,406,125 | 10/1968 | Allegrini | 252—455 |

DANIEL E. WYMAN, Primary Examiner

P. M. FRENCH, Assistant Examiner

U.S. Cl. X.R.

252—443

UNITED STATES PATENT OFFICE
CERTIFICATE OF CORRECTION

Patent No. 3,520,830                                           July 21, 1970

Victor Audley Chapman, Jr.

It is certified that error appears in the above identified patent and that said Letters Patent are hereby corrected as shown below:

Column 4, line 10, after "mix" insert -- by --.

Signed and sealed this 6th day of April 1971.

(SEAL)
Attest:

EDWARD M. FLETCHER, JR.                        WILLIAM E. SCHUYLER, JR.
Attesting Officer                                Commissioner of Patents